Feb. 6, 1934.                H. C. LIMA                1,945,532
                             TRUCK BODY
                     Filed Sept. 19, 1931        3 Sheets-Sheet 1
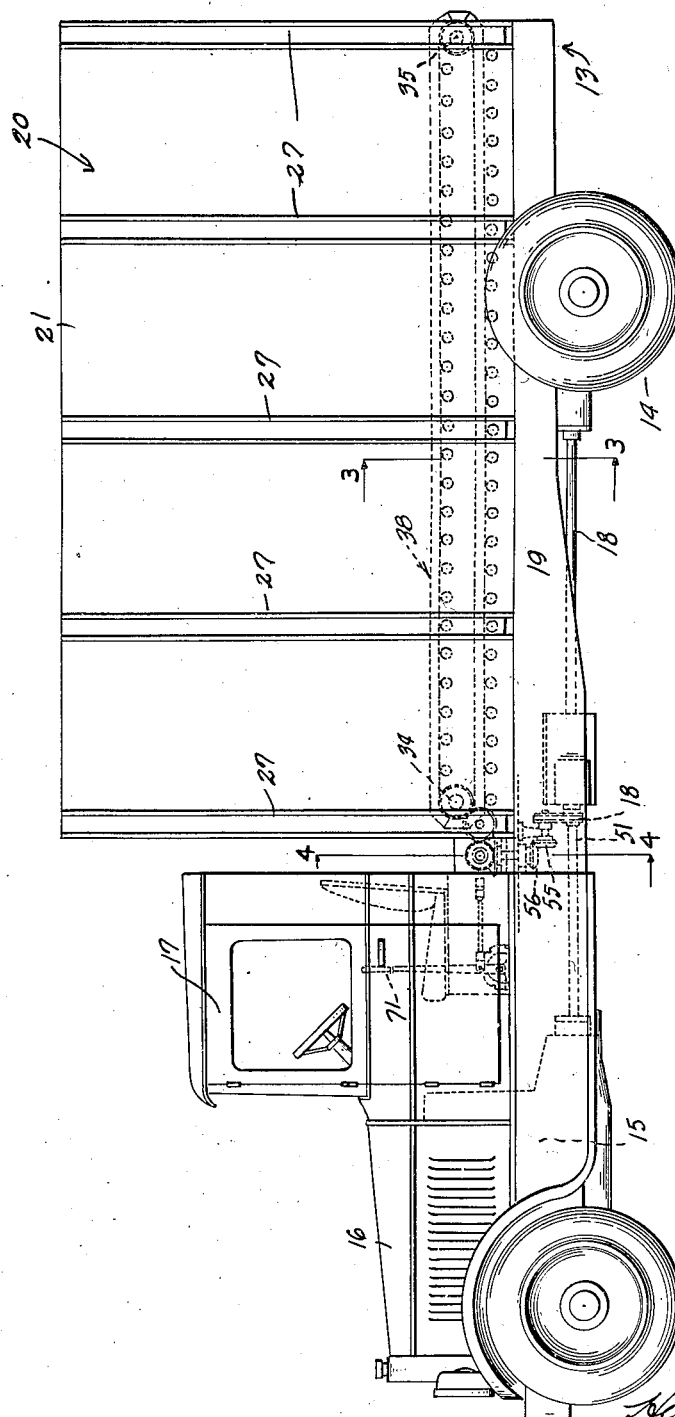

Feb. 6, 1934.                H. C. LIMA                1,945,532
                             TRUCK BODY
                       Filed Sept. 19, 1931      3 Sheets-Sheet 2
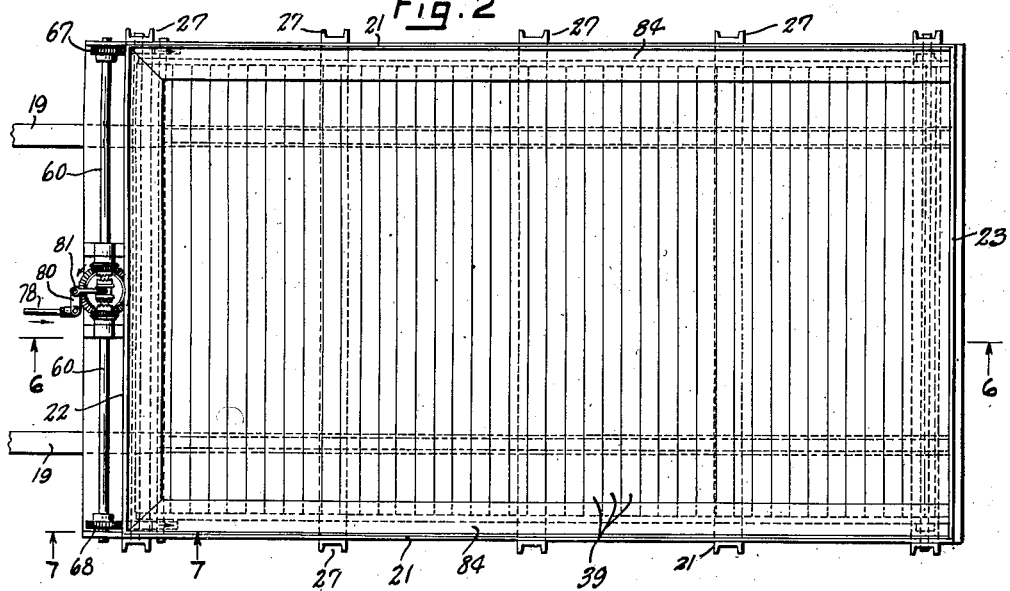
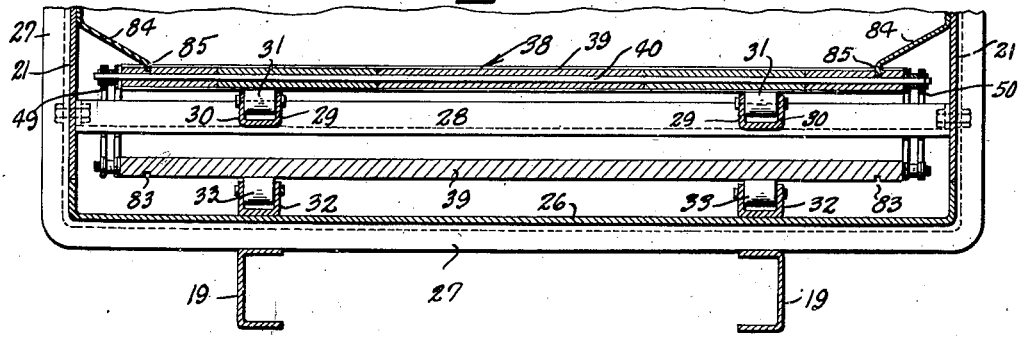
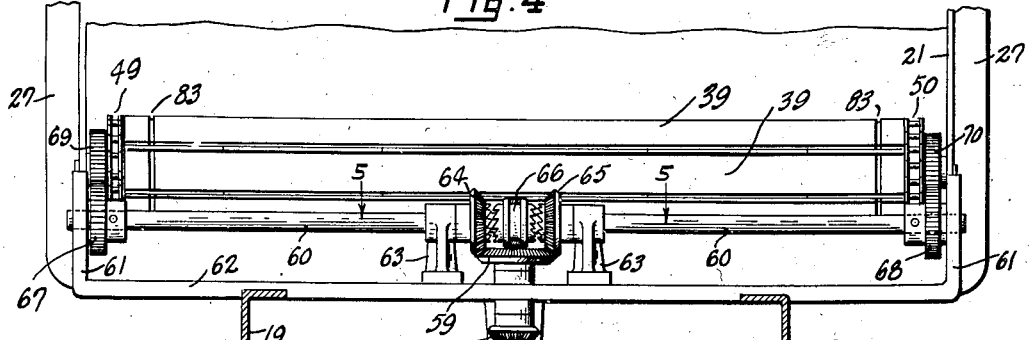
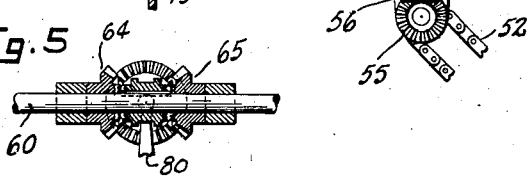
INVENTOR
Henry C. Lima
BY
Wooster & Davis
ATTORNEYS.

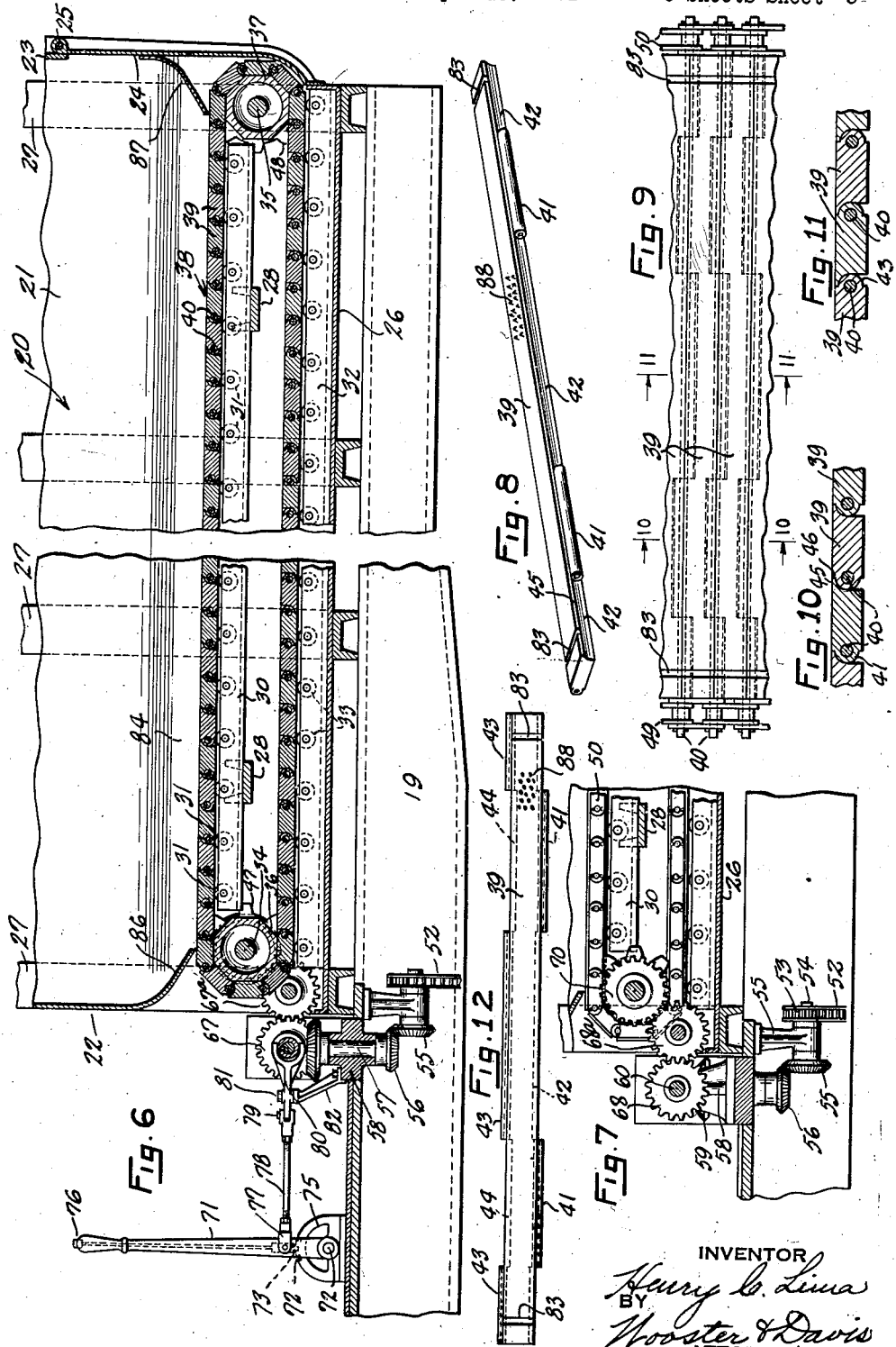

Patented Feb. 6, 1934

1,945,532

UNITED STATES PATENT OFFICE 1,945,532

TRUCK BODY

Henry C. Lima, Stamford, Conn., assignor to Grace T. Lima, Stamford, Conn.

Application September 19, 1931
Serial No. 563,758

8 Claims. (Cl. 214—83)

This invention relates to new and useful improvements in an automobile truck body.

An object of the invention is to provide a truck body particularly adapted to be used in the handling of garbage, refuse, ashes, coal, sand, gravel, boxes, crates or other material and which may be easily and quickly loaded and unloaded.

Another object is to provide a truck body including a bottom in the form of an endless conveyor comprising a series of hinged elements adapted to engage one another in their upper flight in a manner to provide a tight bottom for the truck body, said body being movable to carry a load into or discharge a load from the body of the truck.

Other objects and advantages will become apparent from a consideration of the following detailed description taken in connection with the accompanying drawings wherein a satisfactory embodiment of the invention is illustrated. However, it will be understood that the invention is not limited to the details disclosed but includes all such variations and modifications as fall within the spirit of the invention or the scope of the appended claims to which claims reference should be had for a definition of the invention.

In the drawings:

Fig. 1 is a side elevational view showing a truck equipped with a load carrying bottom in accordance with the present invention;

Fig. 2 is a top plan view showing a truck body equipped with a bottom or floor in accordance with the invention;

Fig. 3 is a sectional view taken substantially along the line 3—3 of Fig. 1;

Fig. 4 is a sectional view substantially along the line 4—4 of Fig. 1;

Fig. 5 is a sectional view taken substantially along the line 5—5 of Fig. 4;

Fig. 6 is a longitudinal sectional view taken substantially along the line 6—6 of Fig. 2, the view being on an enlarged scale;

Fig. 7 is a sectional view along the line 7—7 of Fig. 2 and on an enlarged scale;

Fig. 8 is a perspective view showing one of the slats or elements of the movable bottom;

Fig. 9 is a plan view on an enlarged scale showing several of the elements of Fig. 8 assembled;

Fig. 10 is a transverse sectional view on the line 10—10 of Fig. 9;

Fig. 11 is a similar view taken along the line 11—11 of Fig. 9; and

Fig. 12 is a plan view of one of the slats or elements of Fig. 8.

The movable load carrying floor or bottom of the present invention may be applied to a variety of constructions of truck bodies and while but one type of truck body is here illustrated it is to be understood that this is for the purpose of making clear the principles of the invention and showing one application of the invention and that the invention may be applied to any type or construction of truck body desired. As here disclosed the invention is shown as applied to a truck including a wheeled frame 13 the rear ground engaging wheels 14 of which are adapted to be driven in the usual manner from the engine 15 located beneath the hood 16 forwardly of the driver's cab 17. The driving connection between the engine 15 and the wheels 14 may include shafting 18 as is usual.

Mounted on the frame or chassis 13 which as shown includes a pair of longitudinal channel bars 19 is a body 20 comprising side walls 21 and front and rear walls 22 and 23 respectively and in which rear wall is provided a gate or door 24 hinged as at 25. Further, the body includes a bottom wall or bottom 26, and the body may be strengthened by substantially U-shaped re-enforcing members 27 shown as formed of channel iron. These members 27 embrace the sides 21 of the body and extend beneath the bottom 26 thereof and rest on the longitudinal channel bars 19 of the chassis to which they may be secured by any suitable means, not shown.

Within the body 20 above the bottom 26 thereof are arranged spaced bars 28, said bars extending transversely of the body. At spaced points as at 29, these bars 28 are notched to receive channel irons or bars 30, a pair of the irons 30 being disclosed and these irons being arranged to extend transversely of the body. It will be appreciated that since the irons 30 are received in the notches 29 in the bars 28 the irons are readily located in the body and are held against lateral movement. Further, the irons may be bolted, riveted, welded or otherwise secured to the bars 28. Each iron 30 mounts a plurality of rollers 31 which rollers are so disposed as to extend above the upper edges of the irons.

On the bottom 26 of the body there is disposed a pair of channel iron members 32 extending longitudinally of the body and similar in every respect to the irons 30 above referred to. As clearly shown in Fig. 3 the irons 32 are disposed in vertical alignment with and below the irons 30 although it will be appreciated that such a precise arrangement of parts is not necessary. Each of the irons 32 mounts a series of rollers 33 similar to the rollers 31 above referred to and these rollers 33 are so disposed as to extend above the upper edges of the irons in which they are mounted.

Within and adjacent each end of the body there is mounted a shaft, the shaft at the forward end of the body being indicated by the reference numeral 34 while the shaft at the rear end of the body is designated 35. Drums 36 and 37 are mounted on the respective shafts to turn with them and it will be noted that each drum as here disclosed (see Fig. 6) has a series of flat sides, the purpose of which will later appear. Trained over these drums 36 and 37 is an endless conveyor 38 formed of a series of slats or sections 39 hingedly or pivotally connected by cross bars on pins 40.

As clearly shown in Figs. 8 and 12 each section or slat 39 comprises an elongated body which along one longitudinal edge carries a pair of cylindrical hinge members 41 and is concaved as at the spaces 42 at the ends of the members 41. At its other longitudinal edge each section 39 is shown as carrying three spaced cylindrical hinge members 43 between which are concaved portions 44. As is clear from Figs. 9, 10 and 11 the hinge members 43 at one edge of one slat or section are adapted to be received in the spaces 42 at the sides or ends of the hinge members 41 of the next adjacent section whereby the hinge members of one section are aligned with the hinge members of the next adjacent section and a hinge pin 40 may be passed through the aligned members whereby to hingedly connect one section to the next adjacent section.

The relationship of parts is such that when the sections are hingedly connected and disposed in horizontal position the edge portion 45 of one section will abut against an edge portion 46 of a next adjacent section as clearly shown in Figs. 10 and 11. Thus the sections are not only hinged together to provide an endless conveyer 38 but they are so related that a tight conveyer with in effect a continuous surface is provided owing to the abutting relationship between the edge portions 45 and 46 of adjacent sections or slats as above described. The hinge bars or rods 40 not only hinge the sections 39 together and to the chains 49 but they also hinge the chain links together. These rods or bars 40 also strengthen the sections 39 making them stronger and stiffer.

Sprocket wheels 47 and 48 are disposed for mounting on the respective shafts 34 and 35 at the ends of the drums 36 and 37, and arranged at the edges of the conveyer 38 are endless chains 49 and 50, each chain being trained over a sprocket wheel 47 at the front of the body and a sprocket wheel 48 adjacent the rear of the body. The links forming the chains 49 and 50 are connected by the extending end portions of the rods or pins 40 which rods or pins as above stated also serve to hingedly connect the respective sections or slats 39 forming the conveyer 38. Aside from the fact that the links of the chains 49 and 50 are pivoted together by the end portions of the rods 40 the said chains are of ordinary construction.

It will be clear that as the upper flight of the conveyer moves toward the front or rear of the body the material supported on the conveyer will be carried into the body or out of the body in loading and unloading. It is to be noted that the sections 39 do not turn or hinge relative to each other until they begin to move down the rear part of drum 37 so that the material being unloaded readily drops off without being held in the joint between the sections. Also the interfitting grooved portions 42 and cylindrical portions 41 maintain a tight joint during this hinging movement so that the material cannot pass through the conveyer, but must drop off the rear end thereof. In other words there is practically no opening up of the joint or connection between two sections as they pass over the drum 37 and the conveyer is readily cleared of the material being unloaded. Means are provided whereby to operate the conveyer in either direction by power taken from the engine 15. This means includes a sprocket wheel 51 driven from the engine and which through a chain 52 drives a sprocket wheel 53 on a shaft 54 suitably mounted in a bearing in a bracket 55 which may be secured to a part of the truck chassis.

Also, on the shaft 54 is a beveled gear 55 meshing with and driving a beveled gear 56 on a shaft 57 arranged vertically in a bearing 58 and at its upper end carrying a beveled gear 59. Extending transversely of the body and as here shown disposed between the body and the cab 17 is a shaft 60 having its ends disposed in the upstanding arms 61 of a member or bracket 62 supported on the channel bars 19 of the truck chassis. Additionally, between its end portions the shaft 60 is received in bearings on spaced brackets 63. Between the brackets 63 bevelled gears 64 and 65 are mounted on the shaft 60 in opposed relationship and in a manner to turn freely on the shaft.

The gear 59 before referred to is in driving relation with each of the gears 64 and 65 and keyed to the shaft 60 and disposed between the gears 64 and 65 is a clutch element 66 adapted to be moved along the shaft to clutch either gear 64 or gear 65 to the shaft so that movement imparted to the selected gear will be transmitted to the shaft. Obviously, the gears 64 and 65 are driven in opposite directions and by clutching the desired gear to the shaft the shaft will be driven in the desired direction. Adjacent its respective ends the shaft 60 carries gears 67 and 68 meshing with intermediate gears 67a and 68a which in turn mesh respectively with gears 69 and 70 on the shaft 34 above referred to.

Since the respective sets of gears 67 and 69 and 68 and 70 are constantly in mesh it will be appreciated that movement of the shaft 60 will be positively transmitted to the shaft 34 to drive it in either direction and to accordingly drive the drum 36 and the sprocket wheels 47 in the desired direction. The means for shifting the clutch element 66 is preferably located in the cab 17 whereby it may be conveniently operated by the truck driver. As here disclosed, this means comprises an operating lever 71 pivotally mounted as at 72 and including a pawl 73 adapted to enter a selected notch 74 in a quadrant 75 whereby to lock the operating lever 71 in the desired position. The pawl 73 may be retracted on depressing the thumb-piece 76 as is usual.

Secured to the lever 71 as at 77 is a link member 78 which member is also pivoted as at 79 to a rocking lever or member 80. Lever or member 80 is pivoted at 81 to a bracket 82, the pivot 81 being located intermediate the ends of the member 80 and said member being bifurcated at one end to embrace the clutch element 66. Obviously, as the operating lever 71 is shifted the member 80 will be operated to shift the clutch element 66 in either direction either to move it into clutching engagement with one of the gears 64, 65 or to move it out of engagement with a gear and into a neutral position.

When it is desired to move the bottom forwardly the lever 71 will be shifted to engage the clutch element 66 with one of the gears 64, 65 so as to have the conveyer 38 driven in a direction to cause its upper flight to move toward the front of the truck. In unloading the clutch would, of course, be engaged with the other gear whereby to cause the conveyer to be driven in a direction to have its upper flight moved toward the rear of the truck. In either direction of movement the conveyer provides a tight floor or load carrying bottom for the truck body. The lower part of the body with the walls 21 and 26 are preferably made water tight so that any moisture or liquid that may leak through from the material carried will be retained and may be removed through any suitable valve controlled drain or similar means.

Means are provided to prevent material moving off the edges of the conveyer and into the portion of the truck body below the conveyer. It will be appreciated that any material which might get into the space below the upper flight of the conveyer would come into contact with the sprocket wheels and rollers as well as the chains 49 and 50 and cause damage to and interfere with the proper functioning of the operating mechanism. To prevent this each of the sections or slats 39 is transversely grooved in one face as at 83, the grooves in each section being arranged at the same distance from the ends of the sections whereby when the sections are assembled into a conveyer the conveyer has a groove along each of its edges.

The sides 20 of the body carry inwardly extending members or flanges 84 which members are preferably inclined as best shown in Fig. 3 forming inclined walls between the movable bottom and the side walls 21. At their inner or free edges these members are downturned as at 85 whereby such free edges are disposed in the grooves 83 in the respective sections or slats 39 and will prevent the passage of material over the edges of the conveyer. The front wall 22 of the body may also carry or include an inwardly inclined portion 86 the free edge of which is arranged closely adjacent the conveyer 38 whereby to prevent the passage of material off the front end of the conveyer. If desired, the portions 84 and 86 and particularly the portions 84 may incline inwardly a considerable distance over the conveyer whereby a large portion of any load placed in the body will be supported free of the conveyer or movable bottom wall.

An inwardly and downwardly extending wall 87 similar to wall 86 should be provided on the inner wall of the gate or door 24 to prevent the material being carried from dropping down between the conveyor and the door.

Also if desired the plates or sections 39 of the movable bottom may have their surfaces roughened or provided with upwardly extending lugs or pins as indicated at 88 to prevent the load or articles carried from slipping on the plates when they are operated to shift the load.

Having thus set forth the nature of my invention, what I claim is:

1. The combination of a truck frame, ground wheels, ground wheel driving mechanism mounted on the frame, a body mounted on the frame, an endless conveyer mounted in the body and forming a load receiving bottom therefor, said conveyer having a pair of spaced grooves in its top wall adjacent its opposite side edges extending longitudinally thereof, said body having side pieces extending downwardly into said grooves to prevent material moving off the edges of the conveyer, and means operated by the ground wheel driving mechanism for actuating the endless conveyer.

2. The combination of a truck frame, a body mounted on the frame, an endless conveyer mounted in the body and forming the load receiving bottom thereof, said conveyer comprising a series of hingedly connected elements adapted to engage one another in their upper flight in a manner to provide a tight load carrying bottom for the truck, each of said elements having a pair of grooves in its upper surface adjacent the side edges of the conveyer and said elements arranged to have the grooves of the respective elements aligned whereby the conveyer has a pair of spaced grooves extending longitudinally thereof, said body having inclined side pieces extending downwardly into said grooves in the conveyer to prevent material moving off the edges of the conveyer, and means to operate the conveyer during unloading operations.

3. The combination of a truck frame, a body mounted on the frame, an endless conveyer mounted in the body and forming a load receiving bottom therefor, said conveyer comprising a pair of spaced chains, slats extending between said chains, rods extending through said slats and hinging them together and connecting them to the chains and connecting the links of the chains, said body including walls extending over the chains to the top surface of the conveyer to protect the chains from the material in the body, and means to operate the conveyer to unload the truck.

4. The combination of a truck frame, a body mounted on the frame, and endless conveyer mounted in the body and forming a load receiving bottom therefor, said conveyer comprising a pair of spaced chains, slats extending between said chains, rods extending through said slats and hinging them together and connecting them to the chains and connecting the links of the chains, said slats adapted in the upper flight of the conveyer to engage one another in a manner to provide a tight load receiving bottom for the truck, said body including downwardly inclined walls extending over the chains to the top surface of the conveyer, and means to operate the conveyer to unload the truck.

5. The combination of a truck frame, a body mounted on the frame, an endless conveyer mounted in the body and forming a load receiving bottom therefor, said conveyer comprising a pair of spaced chains, slats extending between said chains, rods extending through said slats and hinging them together and connecting them to the chains and connecting the links of the chains, said slats including abutting portions whereby the conveyer in its upper flight provides a tight bottom for the truck body, said body including downwardly inclined walls extending over the chains to the top surface of the conveyer, and means to operate the conveyer to unload the truck.

6. The combination of a truck frame, a body mounted on the frame, an endless conveyer mounted in the body and forming a load receiving bottom therefor, said conveyer comprising a pair of spaced chains, slats extending between said chains, rods extending through said slats and hinging them together and connecting them to the chains and connecting the links of the chains, said slats adapted in the upper flight of the conveyer to engage one another in a manner to provide a tight load receiving bottom for the truck, each of said slats having spaced grooves in one surface, said slats assembled to have the grooves of each slat align with the grooves of the adjacent slat, said body including inclined side pieces extending into said grooves to prevent material moving off the edge of the conveyer, and means to operate the conveyer to unload the truck.

7. The combination of a truck frame, ground wheels, ground wheel driving mechanism mounted on the frame, a body mounted on the frame, an endless conveyer mounted in the body and forming a load receiving bottom therefor, said body including upright side walls outside the edges of the conveyer and which side walls are continued downwardly below the conveyer and across under the conveyer to provide a water-tight portion of the body beneath said conveyer, and means operated by the ground wheel driving mechanism for actuating the endless conveyer during the operation of unloading the truck.

8. The combination with a truck frame, a body mounted on the frame, cross bars in said body and spaced from the bottom thereof, spaced irons in said body and supported by said bars, rollers on said spaced irons, other irons below said spaced irons, rollers on said other irons, an endless conveyer in the body and forming the load receiving bottom thereof, said conveyer arranged to have its upper flight supported by the rollers on the spaced irons and its lower flight supported by the rollers on said other irons, means to actuate said conveyer during unloading operations, and said body including upright side walls outside the edges of the conveyer, which side walls are continued downwardly below the lower flight of the conveyer and across under this flight to provide a water-tight portion of the body beneath the conveyer.

HENRY C. LIMA.